US008903152B2

(12) United States Patent
Asma et al.

(10) Patent No.: US 8,903,152 B2
(45) Date of Patent: Dec. 2, 2014

(54) METHODS AND SYSTEMS FOR ENHANCED TOMOGRAPHIC IMAGING

(75) Inventors: Evren Asma, Niskayuna, NY (US); Ravindra Mohan Manjeshwar, Glenville, NY (US); Steven Gerard Ross, Pewaukee, WI (US); Sangtae Ahn, Niskayuna, NY (US); David Erik Chevalier, Waukesha, WI (US)

(73) Assignee: General Electric Company, Niskayuna, NY (US)

( * ) Notice: Subject to any disclaimer, the term of this patent is extended or adjusted under 35 U.S.C. 154(b) by 351 days.

(21) Appl. No.: 13/539,028

(22) Filed: Jun. 29, 2012

(65) Prior Publication Data
US 2014/0003689 A1 Jan. 2, 2014

(51) Int. Cl.
G06K 9/00 (2006.01)

(52) U.S. Cl.
USPC .......................................... 382/131

(58) Field of Classification Search
None
See application file for complete search history.

(56) References Cited

U.S. PATENT DOCUMENTS

| 7,405,405 | B2 |   | 7/2008  | Stearns et al.             |
|-----------|----|---|---------|----------------------------|
| 7,417,231 | B2 | * | 8/2008  | Defrise et al. ... 250/363.04 |
| 7,983,465 | B2 |   | 7/2011  | Leroux et al.              |
| 8,000,513 | B2 |   | 8/2011  | Defrise et al.             |
| 8,175,115 | B2 | * | 5/2012  | Thibault et al. ........ 382/131 |
| 8,265,365 | B2 | * | 9/2012  | Panin ........................ 382/128 |
| 8,558,176 | B2 | * | 10/2013 | Komori et al. ............ 250/336.1 |
| 2005/0135664 | A1 | * | 6/2005  | Kaufhold et al. ............ 382/131 |
| 2006/0266946 | A1 | * | 11/2006 | Defrise et al. ........... 250/363.03 |
| 2008/0180580 | A1 | * | 7/2008  | Kadrmas ...................... 348/744 |
| 2008/0219534 | A1 | * | 9/2008  | Faul et al. ...................... 382/131 |
| 2009/0124900 | A1 | * | 5/2009  | Vandenberghe ............... 600/436 |
| 2010/0014734 | A1 | * | 1/2010  | Vija et al. ...................... 382/131 |
| 2010/0054394 | A1 | * | 3/2010  | Thibault et al. ................. 378/8 |
| 2010/0072375 | A1 | * | 3/2010  | Panin ............................. 250/362 |
| 2010/0098312 | A1 | * | 4/2010  | Leahy et al. .................. 382/131 |
| 2010/0198063 | A1 |   | 8/2010  | Huber et al.                |
| 2011/0150305 | A1 | * | 6/2011  | Zeng et al. ..................... 382/131 |
| 2011/0297834 | A1 | * | 12/2011 | Komori et al. ........... 250/363.03 |
| 2012/0070050 | A1 | * | 3/2012  | Panin ............................ 382/131 |
| 2012/0250820 | A1 | * | 10/2012 | Haras et al. ..................... 378/9 |
| 2012/0250821 | A1 | * | 10/2012 | Koehler et al. ................ 378/16 |

(Continued)

OTHER PUBLICATIONS

Sangtae., Optimized Weighting for Fourier Rebinning of Three-Dimensional Time-of-Flight PET Data to Non-Time-of-Flight, IEEE Nuclear Science Symposium Conference Record, pp. 1-8, 2009.

(Continued)

Primary Examiner — Atiba O Fitzpatrick
Assistant Examiner — Thomas A James
(74) Attorney, Agent, or Firm — Robert M. McCarthy

(57) ABSTRACT

Embodiments of methods, systems and non-transitory computer readable media for tomographic imaging are presented. 3D TOF projection data is processed to generate corresponding data in a designated format that allows for computationally cheaper image reconstruction than the 3D TOF projection data. Further, one or more preliminary images are reconstructed from the processed data using a particular image reconstruction technique for one or more iterations. To that end, one or more imaging parameters are iteratively varied every one or more iterations. The imaging parameters, for example, include the designated format, the image reconstruction technique and one or more image quality characteristics. One or more intermediate images are reconstructed from the one or more preliminary images using the iteratively varying imaging parameters. Further, 3D TOF images having the one or more designated image quality characteristics are generated using the one or more intermediate images and the iteratively varying imaging parameters.

20 Claims, 7 Drawing Sheets

(56) References Cited

U.S. PATENT DOCUMENTS

| | | | |
|---|---|---|---|
| 2013/0010920 A1* | 1/2013 | Wein et al. | 378/19 |
| 2013/0108010 A1* | 5/2013 | Markkanen et al. | 378/19 |
| 2013/0207654 A1* | 8/2013 | Takizawa et al. | 324/312 |
| 2013/0336562 A1* | 12/2013 | Zamyatin et al. | 382/131 |

OTHER PUBLICATIONS

Smith., "Image Reconstruction for Prostate Specific Nuclear Medicine Imagers", Thomas Jefferson National Accelerator Facility Newport News, pp. 1-10, Aug. 25, 2006.

Alessio et al., "PET Image Reconstruction", Department of Radiology, pp. 1-22, 2006.

Fessler et al., Penalized Weighted Least-Squares Image Reconstruction for Positron Emission Tomography, IEEE Transactions on Medical Imaging, pp. 290-300, vol. 13, Issue 2, Jun. 1994.

Miller et al., "Bayesian Image Reconstruction for Emission Tomography Incorporating Good's Roughness Prior on Massively Parallel Processors", Department of Electrical Engineering and Institute for Biomedical Computing, pp. 3223-3227, vol. 88, Apr. 1991.

Suhail S. Saquib et al.; "A Non-Homogeneous MRF Model for Multiresolution Bayesian Estimation"; 4 Pages.

Seungseok Oh et al.; "Multigrid Tomographic Inversion With Variable Resolution Data and Image Spaces"; IEEE Transactions on Image Processing, vol. 15, No. 9 Sep. 2006, pp. 2805-2819.

Lin Fu et al.; A residual correction method for high resolution PET reconstruction with application to on-the-fly Monte Carlo based model of positron range; Medical Physics, vol. 37, No. 2, Feb. 2010, pp. 704-713.

* cited by examiner

METHODS AND SYSTEMS FOR ENHANCED TOMOGRAPHIC IMAGING

BACKGROUND

Non-invasive imaging techniques are widely used in security screening, quality control, and medical diagnostic systems. Particularly, in medical imaging, non-invasive imaging techniques such as multi-energy imaging allow for unobtrusive, convenient and fast imaging of underlying tissues and organs. To that end, radiographic imaging systems such as nuclear medicine (NM) gamma cameras, computed tomography (CT) systems, single photon emission CT (SPECT) systems and positron emission tomography (PET) systems generate images that illustrate various biological processes and functions for medical diagnoses and treatment.

PET systems, for example, generate images that represent a distribution of positron-emitting nuclides within a patient's body. Typically, a positron-electron interaction results in annihilation, thus converting entire mass of the positron-electron pair into two 511 kilo-electron volt (keV) photons emitted in opposite directions along a line of response (LOR). In a PET system, detectors placed along the LOR on a detector ring detect the annihilation photons. Particularly, the detectors detect a coincidence event if the photons arrive and are detected at the detector elements at the same time. The PET system uses the detected coincidence information along with other acquired image data for generating two-dimensional (2D) or three-dimensional (3D) PET images for further diagnosis and treatment. To that end, the PET systems may use, for example, Fourier-based or model-based image reconstruction techniques.

Specifically, certain clinical applications may entail use of high-fidelity, near real-time 3D images for investigating and accurately characterizing minute features within a pathological region of a patient, such as in and around a human heart. Typically, the quality of the PET images depends on image statistics, which in turn are closely related to detected coincidence events. Furthermore, the total scan time for detecting the coincidence events may be limited, for example, by the decay of a radioactive isotope used in imaging and by the inability of the patients to remain immobile for extended durations. Additionally, patient size, attenuation, physiology, injected dose and spatial distribution of the detected radiation events affect image quality, often resulting in inadequate signal-to-noise ratio (SNR) at the region of interest (ROI).

Accordingly, certain PET scanners may employ time-of-flight (TOF) information corresponding to a measured difference in time between arrivals of each pair of gamma photons from each annihilation event for reconstructing 3D TOF images with high SNR. Fully 3D TOF PET image reconstruction, for example, using accurate system and noise models, however, involves huge data volumes that entail complex computation and long processing times, thus needing specialized hardware and additional costs. Further, the time and complexity involved in conventional fully 3D TOF imaging limit use of the 3D TOF data in real-time clinical environments.

In view of the huge data volumes, certain PET systems employ analytical or iterative image reconstruction techniques such as using ordered subset expectation-maximization (OSEM) algorithms that reduce computation cost but may sacrifice image quality. Certain other systems rebin 3D TOF data into a lower dimensional space such as into 2D TOF data, for example, using Single Slice Rebinning (SSRB-TOF) or Fourier rebinning techniques. Furthermore, some PET systems are known to employ multi-resolution image reconstruction approaches.

Although these rebinning techniques and multi-resolution approaches reduce data size, they may not be sufficient to accelerate the computations for 3D TOF PET reconstructions significantly, especially in real-time clinical environments that require high fidelity and low-latency 3D TOF images.

BRIEF DESCRIPTION

Certain aspects of the present disclosure are drawn to methods, systems and non-transitory computer readable media for tomographic imaging. 3D TOF projection data is processed to generate corresponding data in a designated format that allows for computationally cheaper image reconstruction than the 3D TOF projection data. Further, one or more preliminary images are reconstructed from the processed data using a particular image reconstruction technique for one or more iterations. To that end, one or more imaging parameters are iteratively varied every one or more iterations. The imaging parameters, for example, include the designated format, the image reconstruction technique and one or more image quality characteristics. One or more intermediate images are reconstructed from the one or more preliminary images using the iteratively varying imaging parameters. Further, 3D TOF images having the one or more designated image quality characteristics are generated using the one or more intermediate images and the iteratively varying imaging parameters.

DRAWINGS

These and other features and aspects of embodiments of the present technique will become better understood when the following detailed description is read with reference to the accompanying drawings in which like characters represent like parts throughout the drawings, wherein.

DETAILED DESCRIPTION

The following description presents exemplary systems and methods for enhanced tomographic imaging. Particularly, embodiments illustrated hereinafter disclose imaging systems and methods that aim to accelerate high-quality PET imaging using a series of reconstructions of increasing accuracy without sacrificing image quality.

Although exemplary embodiments of the present technique are described in the context of a PET system, it will be appreciated that use of the present technique in various other imaging applications and systems is also contemplated. Some of these systems may include computed tomography systems, SPECT scanners, single or multiple detector imaging systems, X-ray tomosynthesis devices, microscopes, digital cameras and/or charge-coupled devices that acquire projection data from multiple view angles.

Further, in addition to medical imaging, embodiments of the techniques and configurations discussed herein may be used in pharmacological and pre-clinical research for the development and evaluation of innovative tracer compounds. Additionally, certain imaging systems, such as General Electric Company's Discovery 530c SPECT system, may employ the present technique for fast and high quality tomographic image reconstruction of a lesion or a small region of the subject such as heart or pancreas. An exemplary environment that is suitable for practicing various implementations of the present technique is discussed in the following sections with reference to FIGS. 1-2.

Figure 1:
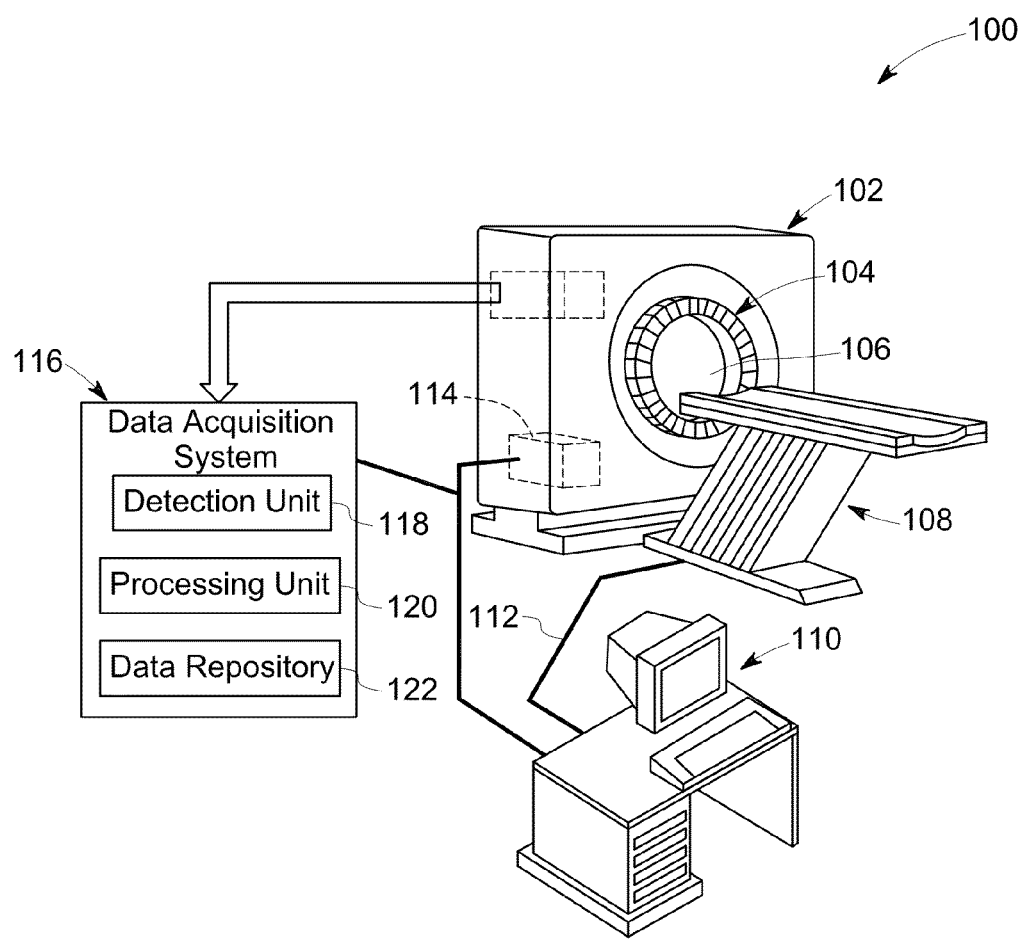
FIG. 1 is a pictorial view of an exemplary imaging system for enhanced tomographic imaging, in accordance with aspects of the present disclosure.

FIG. 1 illustrates an exemplary imaging system 100 for acquiring and processing projection data. In one embodiment, the imaging system 100 corresponds to a PET system. In alternative embodiments, however, the system 100 may include other imaging modalities such a SPECT system or a hybrid imaging system. The hybrid imaging system, for example, includes a PET/CT scanner operable to provide emission and transmission data corresponding to high-fidelity 3D PET and/or CT images.

Accordingly, in certain embodiments, the system 100 includes a gantry 102, which supports a detector ring assembly 104 about a central axis or bore 106. Further, the system 100 includes a patient table 108 positioned in front of the gantry 102, and aligned with the central axis of the bore 106. Additionally, the system 100 includes a table controller (not shown) that moves the table 108 into the bore 106 in response to commands, for example, received from an operator workstation 110 through a communications link 112. The system 100, in one embodiment, also includes a gantry controller 114 that operates the gantry 102 in response to commands received from the operator workstation 110 and/or based on stored instructions. Particularly, the gantry controller 114 suitably positions the gantry 102 to operate in different modes, for example 2D or 3D acquisition modes, and/or perform various types of scans for acquiring sufficient data for image reconstruction.

To that end, the system 100 may also include a data acquisition system (DAS) 116 for acquiring and processing radiation events. In one embodiment, the DAS 116 further includes a detection unit 118 and a processing unit 120 for detecting individual radiation events data and identifying coincidence events based on corresponding timestamps. To that end, the processing unit 120 includes, for example, one or more application-specific processors, graphical processing units, digital signal processors, microcomputers, microcontrollers, Application Specific Integrated Circuits (ASICs), Field Programmable Gate Arrays (FPGAs), or other suitable devices in communication with one or more components of the system 100.

In certain embodiments, the processing unit 120 stores the data associated with the identified coincidence events, for example, in chronological order in a data repository 122, such as a hard disk drive, a floppy disk drive, a compact disk-read/write (CD-R/W) drive, a Digital Versatile Disc (DVD) drive, a flash drive, or a solid-state storage device. The processing unit 120 then uses the chronological list of coincidence data to reconstruct PET scan images for display and diagnosis.

Conventional PET systems typically transform the coincidence data into a 3D image of annihilation events using complex mathematical computations. Specifically, conventional PET systems may use Fourier transform relationships between the 3D image and the sinogram data or corresponding physical or statistical models to generate high quality PET images. Unlike such computation and time-intensive approaches used in conventional PET systems, the processing unit 120 of the system 100 performs a series of reconstructions of increasing accuracy and resolution for efficiently reconstructing regularized time-of-flight (TOF) PET images.

Specifically, the processing unit 120 initiates image reconstruction using coarser imaging parameters for example, using non-TOF data and/or a computationally cheaper image reconstruction algorithm to generate coarser preliminary images. The preliminary images generated in each iteration may serve as the initial images for the next iteration. The processing unit 120 gradually improves the imaging parameters every few iterations to finally arrive at 3D TOF regularized images using a plurality of extremely accurate imaging parameters.

In one implementation, it was determined that the gradual improvements in the imaging parameters starting from coarse parameters to the best imaging parameters significantly reduced time and computation associated with image reconstruction. More particularly, it was determined that the significantly faster imaging achieved by gradual improvements in the imaging parameters also resulted in 3D TOF images having image quality comparable to images generated by performing all iterations with extremely accurate and expensive algorithms. Additionally, it was also ascertained that gradual improvement of only resolution may not be sufficient to achieve significant reduction in imaging time.

Embodiments of the present technique, thus, entail use of a plurality of imaging parameters of increasing accuracy for generating high-fidelity 3D TOF images in a real-time clinical environment. Certain exemplary components of an imaging system for enhanced image reconstruction according to certain aspects of the present technique will be described in greater detail with reference to FIGS. 2-3.

Figure 2:
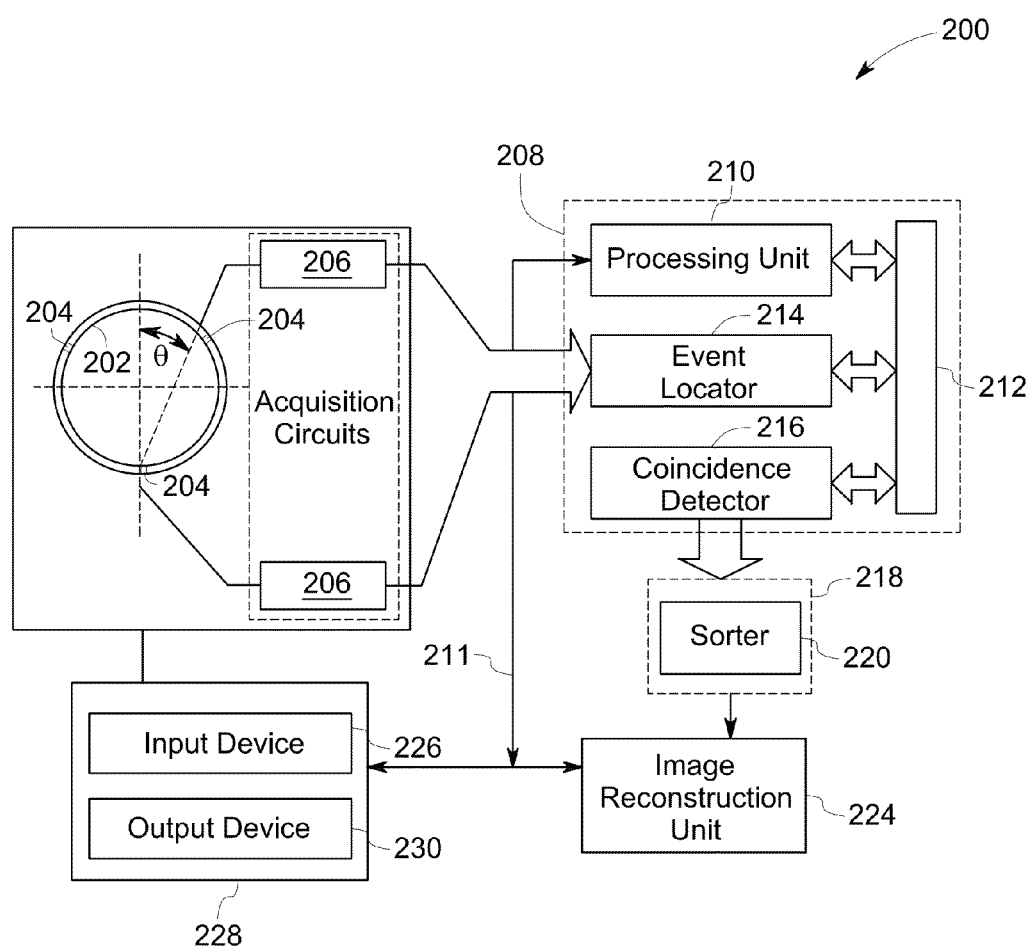
FIG. 2 is a diagrammatic illustration of exemplary components of a PET system for enhanced tomographic imaging, in accordance with aspects of the present disclosure.

FIG. 2 illustrates another embodiment of an exemplary nuclear imaging system 200. The system 200, in certain embodiments, may be similar to the system 100 illustrated in FIG. 1 in one or more functional and/or structural aspects. Specifically, FIG. 2 illustrates certain exemplary components of the system 200 for use in implementing the present technique for enhancing nuclear tomographic imaging. To that end, the system 200 includes a detector ring assembly 202 disposed about a patient bore. The detector ring assembly 202 may include multiple detector rings that are spaced along the central axis to form the detector ring assembly 202. The detector rings, in turn, are formed of detector modules 204 that include, for example, a 6×6 array of individual bismuth germanate (BGO) detector crystals. The detector crystals detect gamma radiation emitted from a patient, and in response, produce photons.

In one embodiment, the array of detector crystals is positioned in front of a plurality of photomultiplier tubes (PMTs). The PMTs produce analog signals when a scintillation event occurs at one of the detector crystals, for example, when a gamma ray emitted from the patient is received by one of the detector crystals. Further, a set of acquisition circuits 206 in the system 200 receive the analog signals and generate corresponding digital signals indicative of the location and the energy associated with the detected radiation event.

Particularly, in one embodiment, the system 200 includes a DAS 208 that periodically samples the digital signals produced by the acquisition circuits 206. The DAS 208, in turn, includes a processing unit 210, which may control communications on the local area network 211 and a backplane bus 212. Additionally, the DAS 208 also includes event locator circuits 214 that assemble information corresponding to each valid radiation event into an event data packet. The event data packet, for example, includes a set of digital numbers that precisely indicate the time of the radiation event and the position of the detector crystal that detected the event.

Further, the event locator circuits 214 communicate the assembled event data packets to a coincidence detector 216 for determining coincidence events. The coincidence detector 216 determines coincidence event pairs if time and location markers in two event data packets are within certain designated thresholds. In one embodiment, the coincidence detector 216 determines a coincidence event pair if time markers in two event data packets are, for example, within 12 nanoseconds of each other and if the corresponding locations lie on a straight line passing through the field of view (FOV) in the patient bore.

In certain embodiments, the system 200 stores the determined coincidence event pairs in a storage subsystem 218 operatively coupled to the system 200. The storage subsystem 218, in one embodiment, includes a sorter 220 to sort the coincidence events in a 3D projection plane format, for example, using a look-up table. Particularly, the sorter 220 orders the detected coincidence event data using one or more parameters such as radius or projection angles for storage. In one embodiment, the processing unit 210 processes the stored data to determine TOF information. The TOF information allows the system 200 to estimate a point of origin of the electron-positron annihilation with greater accuracy, thus improving event localization. The event localization information, in turn may be used to further enhance the quality of reconstructed 3D images.

To that end, in one embodiment, an image reconstruction unit 224 communicatively coupled to the system 200 uses the improved event localization data to generate high-fidelity 3D images of an ROI of the patient for further clinical evaluation. In certain embodiments, the image reconstruction unit 224 is an independent device communicatively coupled to the system 200. In certain other embodiments, the image reconstruction unit 224 may be an integral part of the processing unit 210. Alternatively, the processing unit 210 may perform one or more functions of the image reconstruction unit 224, including generating one or more PET images from the acquired data.

Conventional PET imaging entails huge volumes of data that has to be processed to generate a 3D PET image that accurately characterizes regions and structures of interest in a pathological region of the patient. As previously noted, in conventional PET systems, processing such huge amounts of data may entail use of custom hardware, complex computations, and specialized image reconstruction algorithms, which in turn may add to operational costs, imaging time and patient discomfort. In certain scenarios, such as during accidents or certain emergencies, fast and accurate assessment of patient condition using certain image-derived parameters may be critical for saving the patient's life. In such scenarios, use of conventional PET systems implementing complicated and long image reconstructions may impair patient survival.

Unlike such conventional PET systems, the image reconstruction unit 224 may use embodiments of the present technique that reduce computational complexity and significantly accelerate reconstruction of high-fidelity 3D TOF images. To that end, the image reconstruction unit 224 performs iterative reconstruction by gradually improving one or more imaging parameters over different number of iterations. Particularly, in one embodiment, the image reconstruction unit 224 initiates image reconstruction, for example, using non-TOF data and/or a computationally-cheaper image reconstruction algorithm to generate one or more preliminary images in a lower dimension, for example in 2D. The preliminary images, in turn, are used as initial images for corresponding low-resolution non-TOF regularized reconstructions.

The image reconstruction unit 224, thus, performs iterative reconstructions using coarser imaging parameters until 3D non-TOF images of desired specifications are generated. The image reconstruction unit 224 may use the resulting 3D non-TOF images for generating 3D non-TOF regularized images, which in turn, may further be used for reconstructing 3D TOF regularized images. To that end, every few iterations, the image reconstruction unit 224 may progressively improve the resolution and precision of systems models and/or image reconstruction algorithms based on a cost function associated with image reconstruction.

The imaging parameters that may be progressively improved over multiple stages including one or more iterations to generate high-fidelity 3D TOF images for clinical use may include, for example, accuracy of image reconstruction algorithm and/or system model, TOF or non-TOF data, 2D or 3D datasets and/or resolution. In certain embodiments, the system 200 may allow a user to input and/or customize the imaging parameters via an input device 226 of an operator workstation 228 coupled to the system 200. Additionally, the user may also be able to specify a number of iterations for which the parameters may be used during image reconstruction. Alternatively, the image reconstruction unit 224 may use stored instructions for automatically selecting and/or customizing the imaging parameters for different stages of image reconstruction based on a designated imaging protocol.

In one embodiment, the number of iterations for each stage may be predetermined. In alternative embodiments, however, the number of iterations for different stages may be adaptively determined using certain metrics such as a cost function or similarity measures such as a root mean square (RMS) of designated values. By way of example, the image reconstruction unit 224 may switch to the next stage of the imaging protocol if the RMS difference or the cost function difference between a current and a previous image is smaller than a designated threshold. The designated threshold value or range may also be adaptively determined. Additionally, a criterion for proceeding to the next stage may depend on a single previous image or multiple previous images generated by the image reconstruction unit 224.

Further, the image reconstruction unit 224 transmits the 3D TOF images to an output device 230, such as a display, an audio and/or a video device, for example, coupled to the operator workstation 228. Additionally, in one embodiment, the image reconstruction unit 224 may transmit the 3D TOF images to the processing unit 210 for further analysis. The processing unit 210, in turn, may transmit the 3D TOF images along with image quality and/or diagnostic information derived from the 3D TOF images to the output device 230 in near real-time. Communicating the image quality and/or diagnostic information allows a medical practitioner to assess a health condition of the patient and whether values computed from the reconstructed image can be trusted, thus leading to a more informed diagnosis.

It may be noted that the specific arrangements depicted in FIGS. 1-2 are exemplary. Further, the systems 100 and 200 may be configured or customized for additional functionality, different imaging applications and scanning protocols. Accordingly, in certain embodiments, the systems 100 and/or 200 are coupled to multiple displays, printers, workstations, and/or similar devices located either locally or remotely, for example, within an institution or hospital, or in an entirely different location via one or more configurable wired and/or wireless networks such as the Internet, cloud computing and virtual private networks.

In one embodiment, for example, the systems 100, 200 include, or are coupled to, a picture archiving and communications system (PACS). Particularly, in one exemplary implementation, the PACS is further coupled to a remote system, radiology department information system, hospital information system and/or to an internal or external network to allow operators at different locations to supply commands and parameters and/or gain access to the image data.

Embodiments of the present system 200, thus, use coarser reconstructions to greatly reduce the number of computationally expensive full-resolution 3D TOF iterations during image reconstruction. Further, according to certain aspects of the present technique, use of intermediate reconstructions that progressively improve on imaging parameters every few iterations significantly accelerate the 3D TOF image reconstruction process without sacrificing image quality. Certain exemplary methods for improving tomographic imaging using progressively improving image reconstruction will be described in greater detail with reference to FIG. 3.

Figure 3:
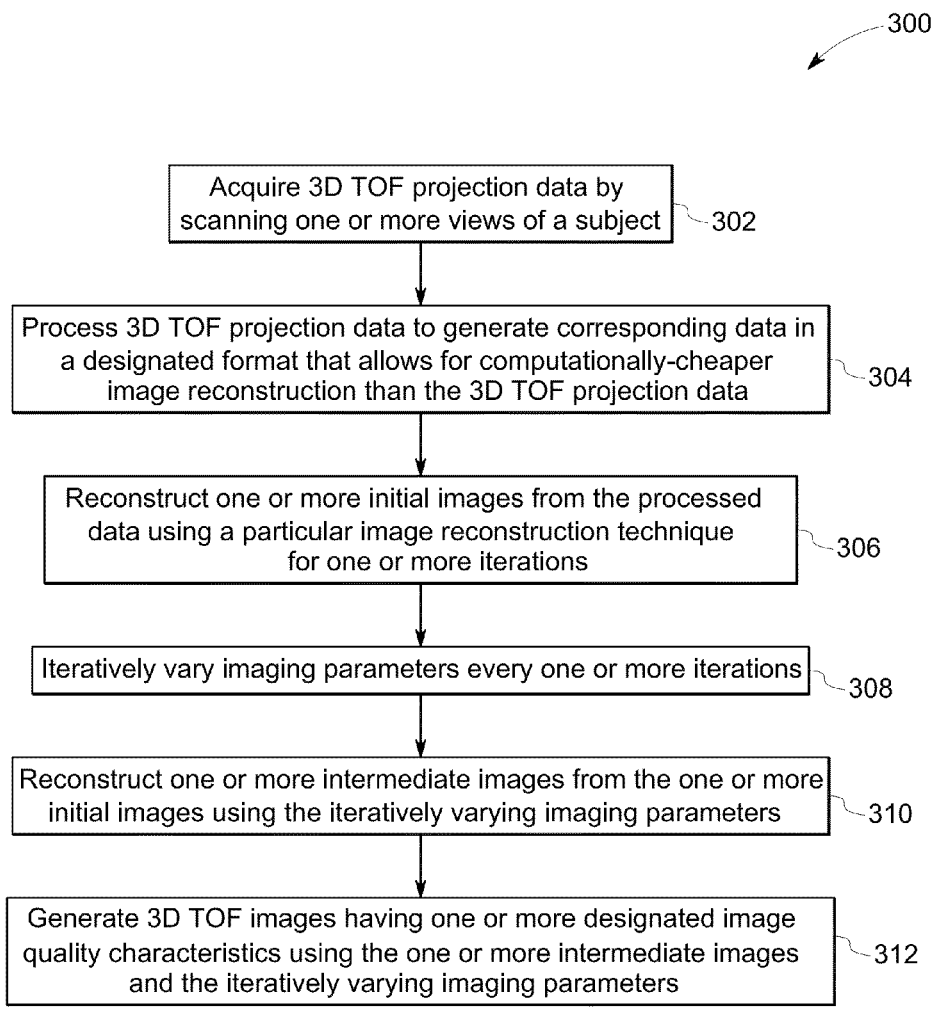
FIG. 3 is a flowchart depicting an exemplary method for enhanced tomographic imaging, in accordance with aspects of the present disclosure.

FIG. 3 illustrates a flow chart 300 depicting an exemplary method for improved tomographic imaging. The exemplary method may be described in a general context of computer executable instructions stored and/or executed on a computing system or a processor. Generally, computer executable instructions may include routines, programs, objects, components, data structures, procedures, modules, functions, and the like that perform particular functions or implement particular abstract data types. The exemplary method may also be practiced in a distributed computing environment where optimization functions are performed by remote processing devices that are linked through a wired and/or wireless communication network. In the distributed computing environment, the computer executable instructions may be located in both local and remote computer storage media, including memory storage devices.

Further, in FIG. 3, the exemplary method is illustrated as a collection of blocks in a logical flow chart, which represents operations that may be implemented in hardware, software, or combinations thereof. The various operations are depicted in the blocks to illustrate the functions that are performed, for example, during data acquisition and iterative image reconstruction phases of the exemplary method. In the context of software, the blocks represent computer instructions that, when executed by one or more processing subsystems, perform the recited operations.

The order in which the exemplary method is described is not intended to be construed as a limitation, and any number of the described blocks may be combined in any order to implement the exemplary method disclosed herein, or an equivalent alternative method. Additionally, certain blocks may be deleted from the exemplary method or augmented by additional blocks with added functionality without departing from the spirit and scope of the subject matter described herein. For discussion purposes, the exemplary method will be described with reference to the elements of FIGS. 1-2.

Generally, tomographic imaging such as PET or SPECT imaging is used to generate 2D or 3D images for various diagnostic and/or prognostic purposes. Conventional imaging techniques allow for a tradeoff between various imaging criteria such as image quality, spatial resolution, noise, radiation dose and total scanning time. Certain clinical applications, however, entail use of images with high spatial resolution or CNR for investigating minute features within a subject, such as in and around a human heart. Particularly, clinical decisions regarding diagnosis and treatment of detected disease conditions are made based on certain image-derived parameters.

Generally, 3D TOF PET images may be used to provide extremely high-fidelity images for accurately characterizing the functional and structural parameters of a ROI for use in diagnosis and treatment. Conventional 3D TOF imaging, however, involves processing a huge volume of data, which in turn, entails use of expensive equipment and longer processing times. Use of conventional 3D TOF PET imaging, thus, may not be feasible in emergencies such as acute stroke, brain ischemia, and intracranial hemorrhage where immediate and accurate assessment from interactive evaluation of near real-time images by a medical practitioner may greatly benefit patient health.

Accordingly, embodiments of the present method describe an image reconstruction technique that allows for faster image reconstruction without sacrificing the 3D TOF PET image quality. For discussion purposes, an exemplary embodiment of the present method will be described with reference to a nuclear imaging technique for improving image reconstruction by progressively improving imaging parameters over one or more iterations.

To that end, at step 302, an imaging system such as the system 200 of FIG. 2 acquires projection data from one or more views of a subject. The acquired projection data may be used to identify and store a difference in time between arrivals of each pair of gamma photons from each annihilation event to determine the 3D TOF information. Particularly, in certain embodiments, the system 200 employs rapid scanning protocols to allow acquisition of projection data for generating a complete ROI image.

At 304, the processing unit 210 processes the 3D TOF information to generate corresponding data in a designated format that allows for computationally cheaper image reconstruction than direct image reconstruction using the 3D TOF projection data. Accordingly, in one embodiment, the processing unit 210 reformats the 3D TOF data into 2D non-TOF data, 2D TOF data and/or 3D non-TOF data based on specific imaging requirements and/or available computational power. To that end, the processing unit 210, for example, may use SSRB-TOF or Fourier rebinning techniques to rebin the 3D TOF data into a lower dimensional space, such as into 2D TOF data, to reduce data size. Alternatively, the processing unit 210 rebins the 3D TOF data into 2D or 3D non-TOF formats using a Fourier transform or any other known technique.

Further, at 306, the image reconstruction unit 224 reconstructs one or more preliminary images from the processed data using a particular image reconstruction technique for one or more iterations. Specifically, in one embodiment, the image reconstruction unit 224 uses 2D non-TOF data to perform a 128×128 OSEM reconstruction for two iterations to generate corresponding preliminary images. At 308, the processing unit 210 iteratively varies one or more imaging parameters after one or more iterations. Particularly, the processing unit 210 progressively selects a data format, a reconstruction technique and/or desired image quality characteristics of increasing accuracy over different stages including successive iterations. As previously noted, the number of iterations for each stage may be predetermined or may be adaptively determined using certain metrics such as a difference between cost functions or RMS values of one or more successive images.

Further, at 310, the image reconstruction unit 224 then uses these iteratively varying parameters to reconstruct one or more intermediate images from the preliminary images. By way of example, the image reconstruction unit 224 may use at least one of the preliminary images as an initial image for a 5-iteration 128×128 2D non-TOF regularized reconstruction. The resulting image may be interpolated transaxially from 128×128×47 to 192×192×47. The interpolated image may then be used as an initial image for a 5-iteration 192×192 2D non-TOF regularized reconstruction. Here again, the image reconstruction unit 224 may interpolate the 192×192 2D non-TOF regularized image transaxially from 192×192×47 to 256×256×47. This interpolated image may be used as an initial image for a 5-iteration 256×256 2D non-TOF regularized reconstruction. The resulting 256×256 2D non-TOF regularized image may be used as the initial image for a 5-iteration 256×256 3D non-TOF regularized reconstruction. The 256×256 3D non-TOF regularized image, in turn, may be used as the initial image for a 256×256 3D TOF regularized reconstruction.

Thus, at step 312, the image reconstruction unit 224 generates 3D TOF images having the designated image quality characteristics using the one or more intermediate images and the iteratively varying imaging parameters. Specifically, as illustrated using the example described herein, the imaging parameters such as the data format may be varied from 2D non-TOF to 3D non-TOF after a determined number of iterations.

Alternatively, TOF mashing factor may be varied every few iterations to allow use of partial TOF data. The TOF mashing factor, as used herein, refers to a data reduction factor indicative of the reduction in the TOF data size by summing adjacent TOF bins. Higher the TOF factor, greater is the reduction in the data size, and thus, lesser is the computational complexity at the specific iteration. It may be noted that the number of iterations in OSEM, 2D, partial- and non-TOF reconstructions as well as those in final reconstruction may be modified based on available computational power.

Similarly, in certain embodiments, the image reconstruction unit 224 may vary the image reconstruction technique from a computationally inexpensive OSEM-based reconstruction to 2D non-TOF reconstruction to 3D non-TOF reconstruction to regularized 3D TOF reconstruction. Further, the designated values of other imaging parameters such as spatial resolution, signal energy, signal-to-noise ratio, contrast-to-noise ratio, TOF mashing factor, number of subsets of imaging data, contrast recovery, lesion bias and/or detectability may be varied from corresponding lower to higher values over successive iterations until a desired image quality is achieved.

Additionally, in one embodiment, the image reconstruction unit 224 may move from a less precise but faster system model to progressively more accurate models during the iterative image reconstruction. By way of example, the image reconstruction unit 224 may employ a system model entailing Fourier-based forward projectors during initial iterations and may subsequently use a system model entailing space-based forward projectors during successive iterations.

In another embodiment, the image reconstruction unit 224 initially employs system models that determine detection probabilities by calculating an intersection length between line between detectors and an imaged voxel. These less precise system models may ignore detector point spread function (PSF) effects in PET and detector & collimator PSF effects in SPECT to allow for faster image reconstruction during the first few iterations. Subsequently, the image reconstruction unit 224 may employ more accurate system models that calculate solid angles seen by voxels at detector surfaces with accurate physical models for mitigating detector PSF effects in PET and detector & collimator PSF effects in SPECT to generate high-quality images.

The processing unit 210, thus, may vary the imaging parameters to allow movement from coarser-scale image reconstructions to high-fidelity 3D TOF reconstructions by progressively selecting imaging parameters of increasing computational cost. In the present example, the 3D TOF reconstructions were limited to between 5-10, which is much less than a typical 30-40 iterations at full resolution, all of which are performed using a computation and time intensive 3D TOF reconstruction technique to generate the 256×256 3D TOF image. The gradual increase in the imaging parameters reduces the number of iterations using the 3D TOF reconstructions, in turn leading to reduced time and computation costs.

Figure 4:
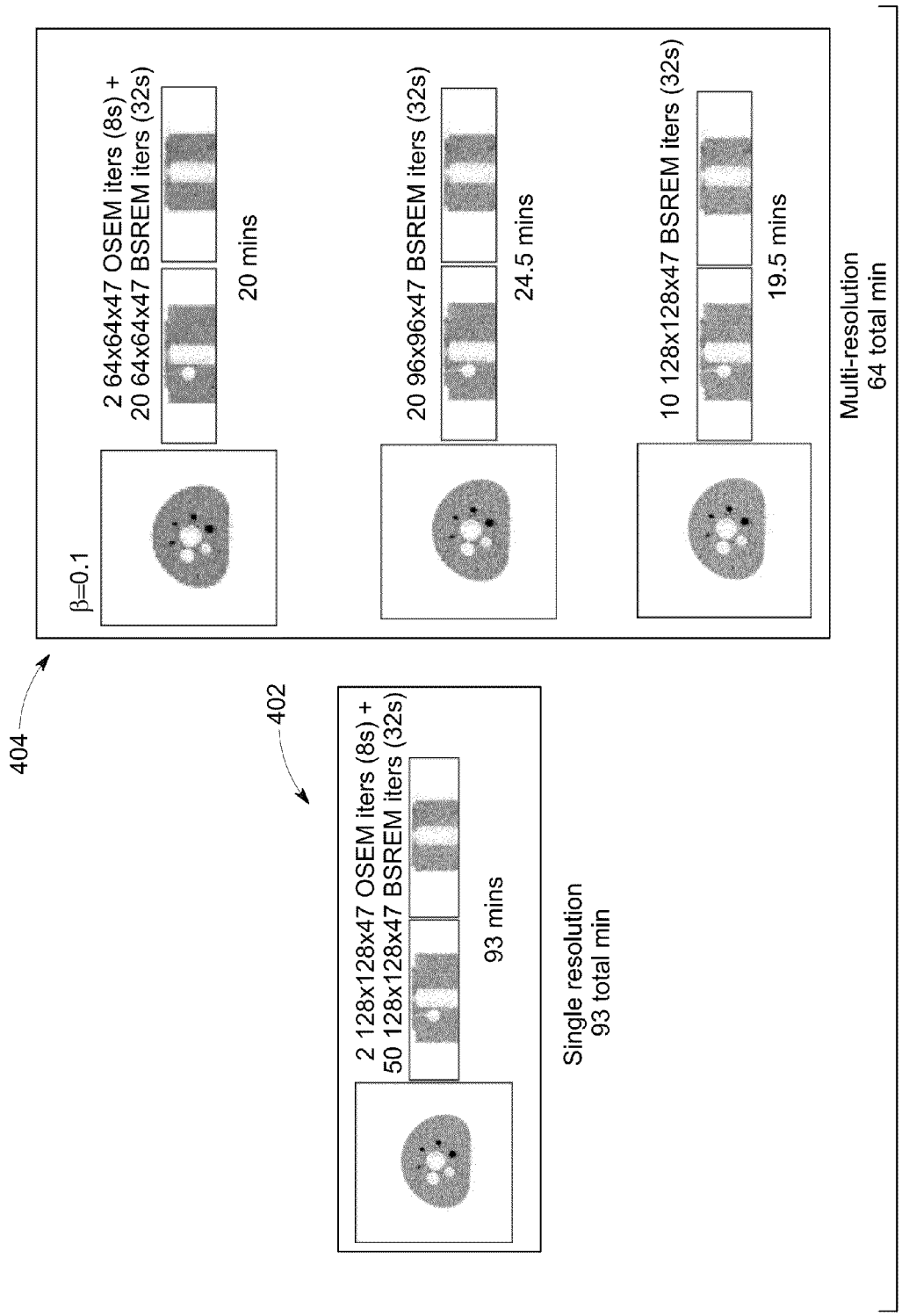
FIG. 4 is an illustration depicting a comparison between single resolution and multi-resolution based image reconstructions.

Specifically, FIG. 4 illustrates the reduction in imaging time achieved by varying the spatial resolution according to the exemplary method described with reference to FIG. 3. Element 402 illustrates image reconstruction performed at a single resolution, for example, 128×128. Image reconstruction was initiated using 128×128×47 OSEM-based reconstruction for two iterations followed by 50 iterations of 128×128×47 of regularized image reconstruction, for example, using a block sequential regularized expectation maximization (BSREM)-based reconstruction. The total imaging time for generating the final image was about 93 minutes.

In contrast, element 404 illustrates image reconstruction performed using a plurality of resolutions. In 404, image reconstruction was initiated using 64×64×47 OSEM-based reconstructions for two iterations followed by 20 iterations of 64×64×47 BSREM-based reconstruction. The spatial resolution was then improved to 96×96×47 for 20 iterations, and further to 128×128×47 for 10 iterations for generating the final image. Image reconstruction 404 using the progressively improving spatial resolution took only 64 minutes in comparison to the 93 minutes taken by the image reconstruction 402 using a single resolution.

Figure 5:
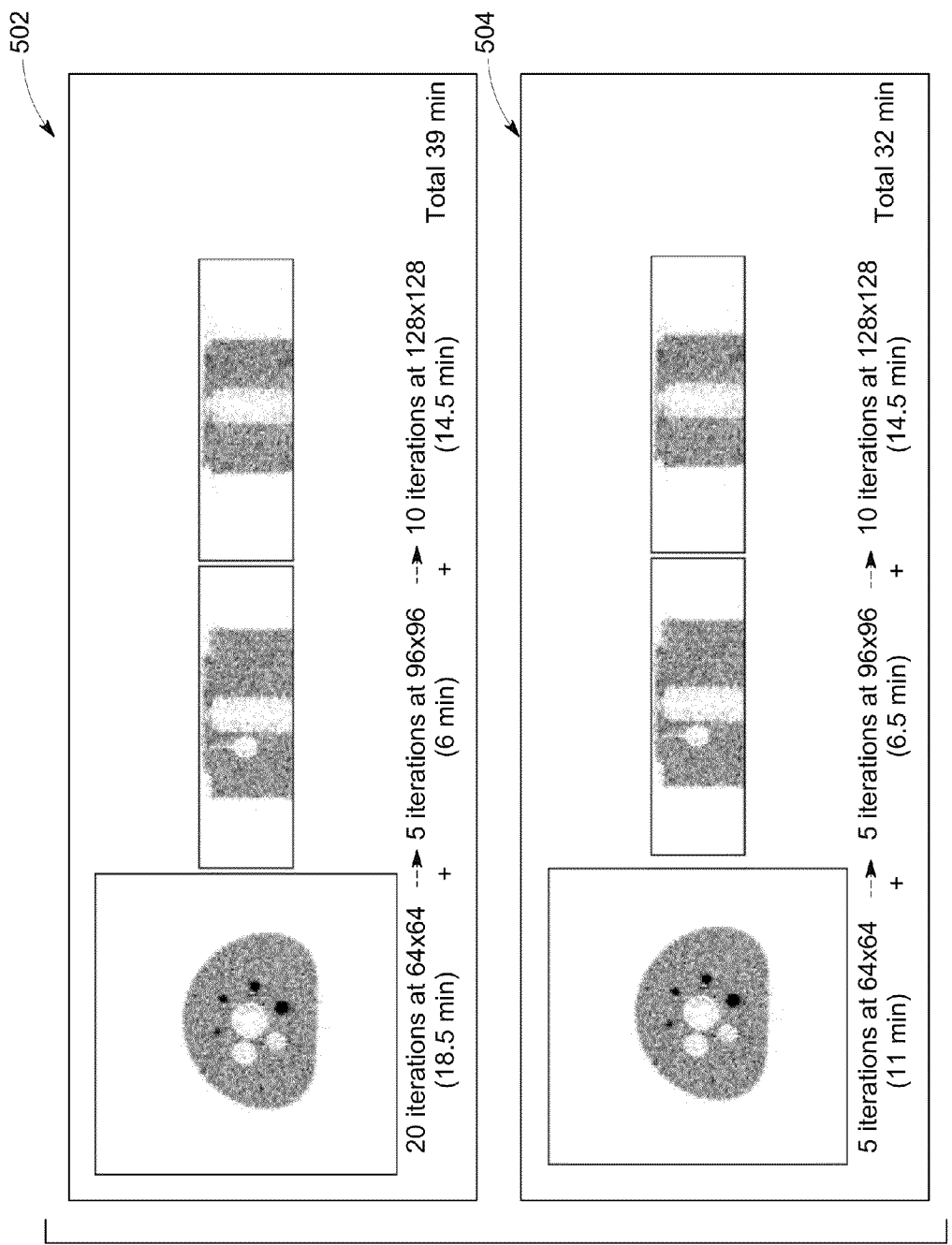
FIG. 5 is an illustration depicting a comparison between two imaging protocols having different numbers of initial iterations, in accordance with aspects of the present disclosure.

However, it was also found that merely performing more iterations using the least accurate imaging parameters may not result in the most optimized imaging times. FIG. 5, for example, shows images 502 reconstructed in a total of 39 minutes using 20 initial iterations at 64×64 resolution, 5 iterations at 96×96 resolution and 10 iterations at 128×128 resolution. In contrast, images 504 having substantially same image quality as the images 502, were reconstructed in 32 minutes by performing only 5 initial iterations at 64×64 resolution, all other parameters being similar to the reconstruction of the images 502. FIG. 5, thus, illustrates that progressive improvement in the accuracy of imaging parameters every few iterations is the key for optimizing imaging times rather than performing most iterations using the least expensive imaging parameters.

Figure 6:
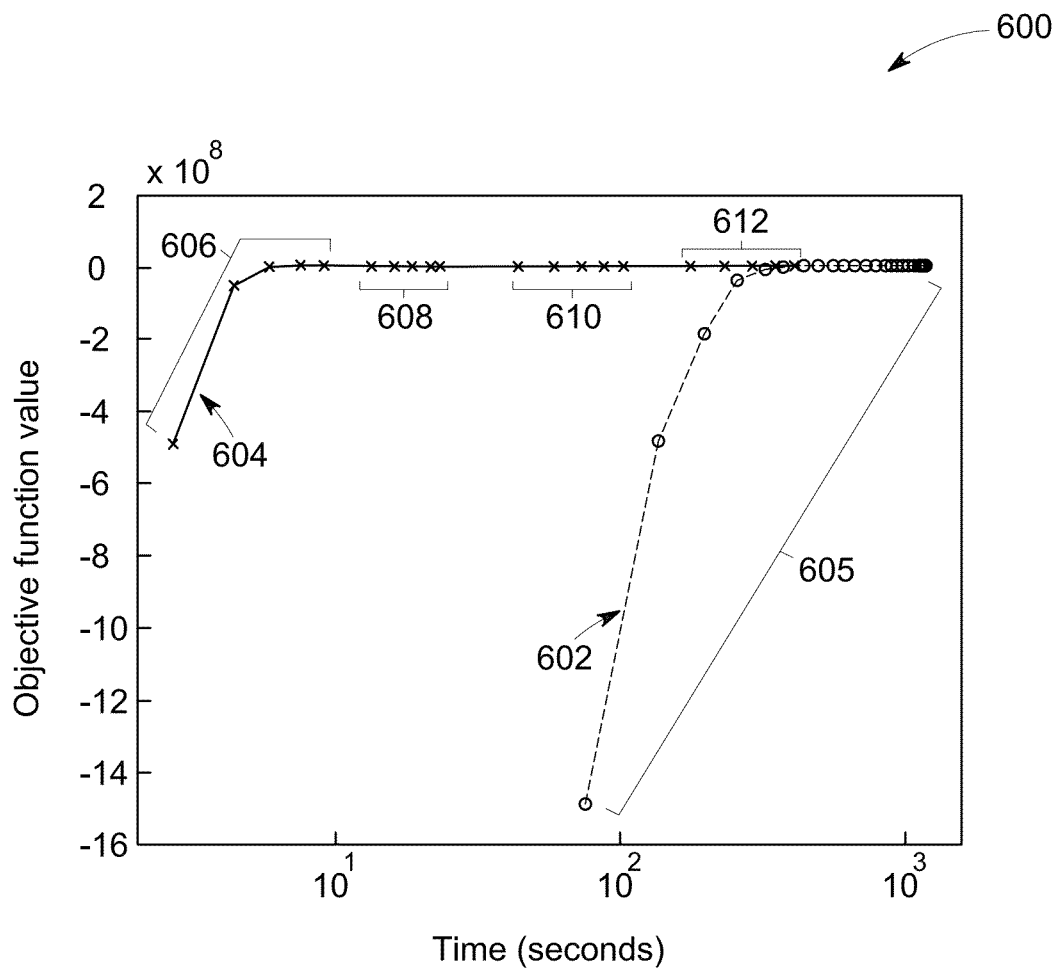
FIG. 6 is a graphical representation depicting image reconstructions using different imaging protocols, in accordance with aspects of the present disclosure.

Furthermore, it was also determined that varying only the spatial resolution may not provide an optimum reconstruction scenario. FIG. 6, for example, illustrates an exemplary graphical representation 600 indicative of image reconstruction using multi-stage imaging protocols and using progressively accurate image reconstruction algorithms in comparison to another imaging protocol using a single-stage approach that uses a constant high resolution, accurate and computationally expensive algorithm. Accordingly, the graphical representation 600 depicts two objective function-versus-time curves 602 and 604 representative of optimized image reconstruction using two different imaging protocols, where each mark in the curves 602 and 604 is representative of one iteration. For both the curves 602 and 604, the image reconstruction was performed using quadratic penalties for regularization, and ordered subset maximum a priori expectation maximization (OS MAP-EM)-based numerical algorithm.

In the graphical representation 600, the curve 602 is representative of a variation in objective function value over time when using a constant or a single stage imaging protocol, for example, using a single high resolution, accurate system model and a computationally expensive algorithm. Although in the presently contemplated implementation, the curve 602 is representative of image reconstruction in which all 20 iterations were performed at 128×128 resolution using fully TOF, detector PSF model-based image reconstruction (denoted by reference numeral 605), other regularized image reconstruction methods may also be employed. By way of example, in one embodiment, imaging protocols that use one or more accurate system and functional models for mitigating physical effects such as scatter and attenuation and for performing optimization using globally convergent algorithms may be employed for desired image reconstruction.

The curve 604, however, is representative of image reconstruction using a multi-stage imaging protocol that progressively varies the resolution, data format and the system model over a designated period of time and/or every few iterations. Particularly, the curve 604 is indicative of the progressive improvement in imaging parameters that allow generation of an image having substantially the same image quality as generated by the image reconstruction depicted by the curve 602. Specifically, the image reconstruction corresponding to the curve 604 involved 5 iterations at 128×128 resolution using non-TOF, no PSF model denoted by reference numeral 606. The set of iterations at 606 was followed by 5 iterations at 192×192 resolution using non-TOF, no PSF model denoted by reference numeral 608 and 5 iterations at 256×256 resolution using partial TOF (TOF mashing factor=5) and PSF model denoted by reference numeral 610. Finally, 5 iterations at 256×256 resolution using fully TOF, detector PSF model-based image reconstruction denoted by reference numeral 612 were performed to generate 3D TOF images of desired image quality.

Figure 7:
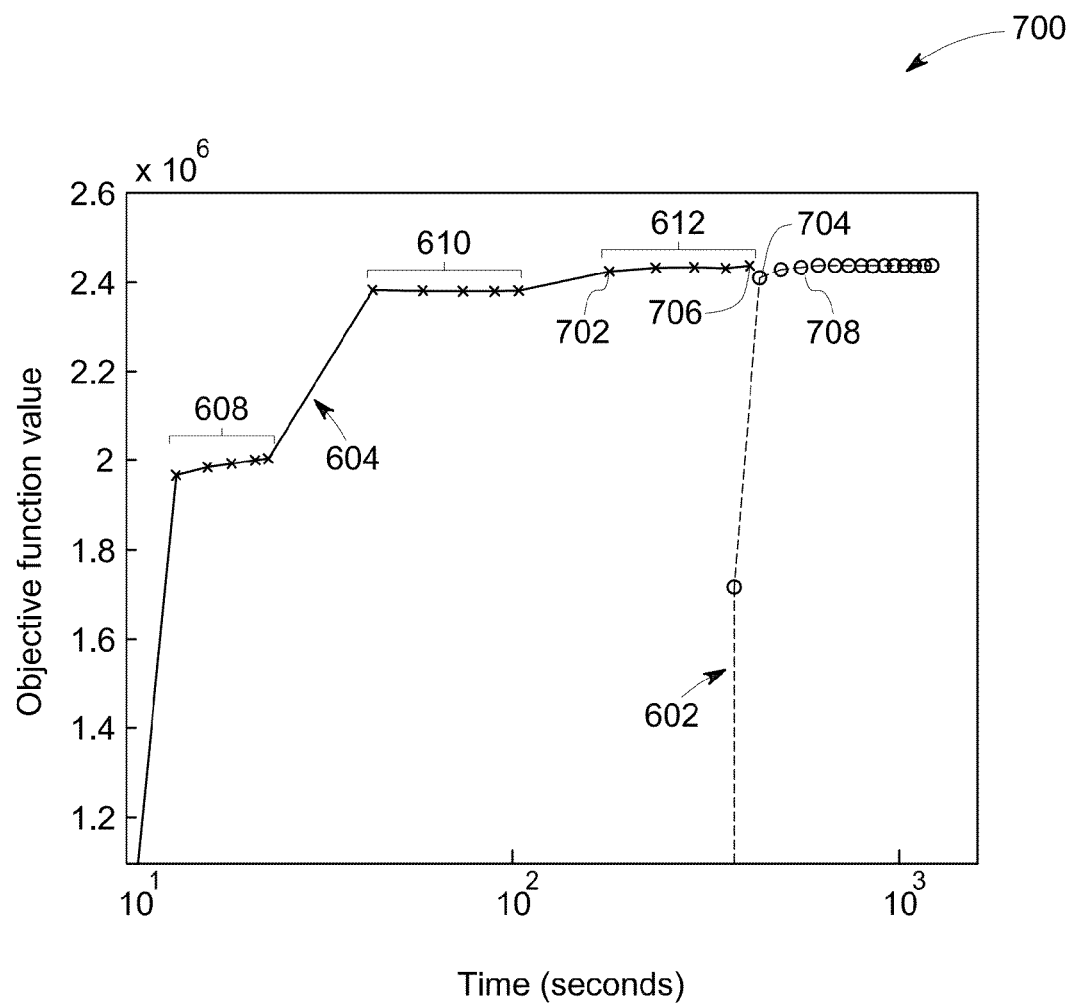
FIG. 7 is magnified representation of a portion of the graphical representation of FIG. 6, in accordance with aspects of the present disclosure.

FIG. 7 illustrates a magnified representation 700 of a portion of the graphical representation 600 of FIG. 6. Specifically, designated portions of the curves 602 and 604 have been magnified to illustrate the increase in the objective function value over time and/or successive iterations. As indicated by the curve 604, the multi-stage imaging approach takes about 178 seconds to reach a point 702, whereas the single-stage imaging protocol takes 437 seconds to reach a similar level of objective function value at a point 704. Further, the multi-stage imaging protocol takes about 412 seconds to reach a point 706, while the single-stage imaging protocol takes about 619 seconds to reach a similar level of objective function value at the point 708.

A comparison of the curves 602 and 604 clearly indicates that performing all or a majority of iterations at the highest resolution and using most accurate and expensive algorithms may not necessarily allow for the optimum imaging time. The curve 604 depicts that gradually improving the imaging parameters such as the resolution and system model allows for faster convergence towards a desired value of the objective function, and thus, the final image in comparison to using the most expensive approach over the entire reconstruction as depicted in curve 602. The graphical representation 700, thus, indicates that an appropriate combination of imaging parameters, such as spatial resolution, image reconstruction algorithm, system models and/or data format, have to be progressively improved every few iterations to allow for faster yet accurate reconstructions.

Embodiments of the present systems and methods, thus, describe a nuclear imaging technique for accelerating image reconstruction by progressively improving a combination of imaging parameters in stages over different iterations. The specific imaging parameters used and the number of iterations may be varied based on the available computational resources, an imaging scenario and/or user requirements. However, it may be noted, that the embodiments of present systems and methods may also be applicable to other inverse problems that may be formulated in the form of a cost-function optimization. These inverse problems, for example, may include multi-resolution image registration, optical flow estimation, interpolation of missing data, image segmentation, image analysis, image restoration and anisotropic diffusion.

Although specific features of various embodiments of the present systems and methods may be shown in and/or described with respect to only certain drawings and not in others, this is for convenience only. It is to be understood that the described features, structures, and/or characteristics may be combined and/or used interchangeably in any suitable manner in the various embodiments, for example, to construct additional assemblies and techniques. Furthermore, the foregoing examples, demonstrations, and process steps, for example, those that may be performed by the processing unit 210, the gantry controller 114, the DAS 208 and the image reconstruction unit 224 may be implemented by a single device or a plurality of devices using suitable code on a processor-based system.

It should also be noted that different implementations of the present technique may perform some or all of the steps described herein in different orders or substantially concurrently, that is, in parallel. In addition, the functions may be implemented in a variety of programming languages, including but not limited to Python, C++ or Java. Such code may be stored or adapted for storage on one or more tangible, machine-readable media, such as on data repository chips, local or remote hard disks, optical disks (that is, CDs or DVDs), solid-state drives or other media, which may be accessed by a processor-based system to execute the stored code.

While only certain features of the present invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A method for tomographic imaging, comprising:
processing three-dimensional time-of-flight projection data to generate corresponding data in a designated format that allows for computationally-cheaper image reconstruction than the three-dimensional time-of-flight projection data;
reconstructing one or more preliminary images from the processed data using a particular image reconstruction technique for one or more iterations;
iteratively varying one or more imaging parameters every one or more iterations, wherein the one or more imaging parameters comprise the designated format, the image reconstruction technique and one or more image quality characteristics;

reconstructing one or more intermediate images from the one or more preliminary images using the iteratively varying imaging parameters; and generating three-dimensional time-of-flight images having the one or more designated image quality characteristics using the one or more intermediate images and the iteratively varying imaging parameters.

2. The method of claim 1, further comprising acquiring three-dimensional time-of-flight projection data by scanning one or more views of a subject.

3. The method of claim 1, further comprising iteratively varying the one or more imaging parameters every one or more iterations until three-dimensional time-of-flight images having the one or more designated image quality characteristics are generated.

4. The method of claim 1, wherein processing three-dimensional time-of-flight projection data comprises converting the three-dimensional time-of-flight projection data into two-dimensional non-time-of-flight data, two-dimensional partial-time-of-flight data with time-of-flight mashing, two-dimensional time-of-flight data, three-dimensional non-time-of-flight data, three-dimensional partial time-of-flight data with time-of-flight mashing, or combinations thereof.

5. The method of claim 1, wherein the image reconstruction technique comprises iterative image reconstruction, regularized image reconstruction, model-based image reconstruction, ordered subset expectation maximization-based reconstruction, block sequential regularized expectation maximization-based reconstruction, ordered subset maximum a priori expectation maximization-based reconstruction, or combinations thereof.

6. The method of claim 1, wherein the one or more image quality characteristics comprise spatial resolution, signal energy, signal-to-noise ratio, contrast-to-noise ratio, contrast recovery, lesion bias, detectability, time-of-flight mashing factor, number of subsets of imaging data, or combinations thereof.

7. The method of claim 1, wherein iteratively varying one or more imaging parameters comprises selecting the one or more imaging parameters of increasing computational cost every one or more iterations.

8. The method of claim 1, further comprising determining a number of iterations after which the one or more imaging parameters are varied based on one or more determined metrics.

9. The method of claim 1, further comprising varying the one or more imaging parameters if difference in value of one or more determined metrics between two or more preliminary images, intermediate images, or combinations thereof, is outside a designated threshold.

10. The method of claim 9, wherein the one or more determined metrics comprise a predetermined value, a cost function or a root mean square value associated with one or more of the preliminary images, intermediate images, or combinations thereof.

11. A nuclear medicine imaging system, comprising:
one or more detectors configured to acquire three-dimensional time-of-flight projection data from one or more views corresponding to a subject; and
a processing unit operationally coupled to one or more of the detectors, wherein the processing unit:
processes the three-dimensional time-of-flight projection data to generate corresponding data in a designated format that allows for computationally-cheaper image reconstruction than the three-dimensional time-of-flight projection data;
iteratively varies one or more imaging parameters every one or more iterations, wherein the one or more imaging parameters comprise the designated format, the image reconstruction technique and one or more image quality characteristics; and
an image reconstruction unit operationally coupled to the processing unit, where the image reconstruction unit:
reconstructs one or more preliminary images from the processed data using a particular image reconstruction technique for one or more iterations;
reconstructs one or more intermediate images from the one or more preliminary images using the iteratively varying imaging parameters; and
generates three-dimensional time-of-flight images having the one or more designated image quality characteristics using the one or more intermediate images and the iteratively varying imaging parameters.

12. The nuclear medicine imaging system of claim 11, wherein the imaging system comprises a single or multiple detector imaging system, a positron emission tomography scanner, a single photon emission computed tomography scanner, a dual head coincidence imaging system, or combinations thereof.

13. The nuclear medicine imaging system of claim 11, wherein the processing unit iteratively varies the one or more imaging parameters every one or more iterations until three-dimensional time-of-flight images having the one or more designated image quality characteristics are generated.

14. The nuclear medicine imaging system of claim 11, wherein the processing unit selects the one or more imaging parameters of increasing computational cost every one or more iterations.

15. A non-transitory computer readable medium that stores instructions executable by one or more processors to perform a method for tomographic imaging, comprising:
processing three-dimensional time-of-flight projection data to generate corresponding data in a designated format that allows for computationally-cheaper image reconstruction than the three-dimensional time-of-flight projection data;
reconstructing one or more preliminary images from the processed data using a particular image reconstruction technique for one or more iterations;
iteratively varying one or more imaging parameters every one or more iterations, wherein the one or more imaging parameters comprise the designated format, the image reconstruction technique and one or more image quality characteristics;
reconstructing one or more intermediate images from the one or more preliminary images using the iteratively varying imaging parameters; and
generating three-dimensional time-of-flight images having the one or more designated image quality characteristics using the one or more intermediate images and the iteratively varying imaging parameters.

16. The non-transitory computer readable medium of claim 15, further comprising iteratively varying the one or more imaging parameters every one or more iterations until three-dimensional time-of-flight images having the one or more designated image quality characteristics are generated.

17. The non-transitory computer readable medium of claim 15, wherein iteratively varying one or more imaging parameters comprises selecting the one or more imaging parameters of increasing computational cost every one or more iterations.

18. The non-transitory computer readable medium of claim 15, further comprising determining a number of iterations after which the one or more imaging parameters are varied based on one or more determined metrics.

19. The non-transitory computer readable medium of claim 15, further comprising varying the one or more imaging parameters if difference in value of one or more determined metrics between two or more preliminary images, intermediate images, or combinations thereof, is outside a designated threshold.

20. The non-transitory computer readable medium of claim 19, wherein the one or more determined metrics comprise a predetermined value, a cost function or a root mean square value associated with one or more of the preliminary images, intermediate images, or combinations thereof.

* * * * *